United States Patent Office 3,328,358
Patented June 27, 1967

3,328,358
N-HYDROXYMALEAMIC ACID COPOLYMER SALTS
Sherman C. Lashua, Midland, Mich., assignor to The Dow Chemical Company, Midland, Mich., a corporation of Delaware
No Drawing. Filed Aug. 31, 1964, Ser. No. 393,356
2 Claims. (Cl. 260—77.5)

The present invention relates to alkali metal salts of copolymers of N-hydroxymaleamic acid and N-vinyl-cyclic carbamates. These copolymer salts are characterized by a plurality of recurring groups which may be represented by an infrared-identified structure corresponding to

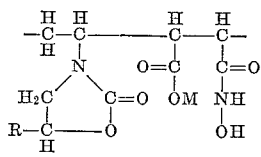

wherein R is hydrogen, methyl or ethyl and M is sodium or potassium.

The copolymer salts of the present invention are prepared by reacting an N-vinyl-cyclic carbamate and maleic anhydride copolymer with hydroxylamine in the presence of an excess of an alkali metal base. An excess of base is essential to prevent formation of the N-hydroxylmaleimide copolymer described in my copending application, Ser. No. 372,397, filed June 3, 1964.

The alkali metal copolymer salts of the present invention are especially useful as metal sequestering agents as more particularly described below.

The novel copolymer salts of this invention may be prepared in a wide range of relatively high molecular weights by employing as a starting material the N-vinyl-cyclic carbamate-maleic anhydride copolymers described in U.S. Patent 3,044,992.

In the general method of preparing the novel copolymer salts of the present invention, a basic solution of hydroxylamine is prepared in a suitable solvent and the N-vinyl-cyclic carbamate-maleic anhydride copolymer is slowly added to this solution with stirring at a controlled temperature. Following completion of the reaction the copolymer salt, insoluble in the solvent employed, is recovered from the mixture, preferably by centrifugation. The water-soluble product is washed with additional amounts of the solvent employed for the reactants and then dried. The temperature is maintained during the reaction at from about −10° C. to the boiling point of the solvent with a temperature of −10° C. to about 30° C. preferred.

The solvent employed may be chosen from a wide range of materials which dissolve the reactants and are inert toward the reactants and product. Suitable reactant solvents will be readily discernible to those skilled in the art. Preferred solvents are the lower alkanols, i.e. methanol, ethanol and propanol. An excess of base, at least equivalent to the molar concentration of copolymer reactant, is preferably employed to ensure formation of the desired N-hydroxymaleamic acid copolymer salt. In the absence of base in the reaction mixture, maleic anhydride moieties are converted to the cyclized N-hydroxy-maleimide form.

The following examples illustrate the practice of the present invention and the utility of the novel copolymer salts obtained but are not to be construed as limiting the same.

Example 1

A solution of 69.5 g. (1 mole) of hydroxylamine hydrochloride in 350 ml. of methanol and a solution of 80.0 g. (2 moles) of sodium hydroxide in 350 ml. of methanol were separately prepared at reflux temperatures and then cooled to 40° C. The two solutions were then slowly mixed with intermittent cooling and a final cooling in an ice bath to complete precipitation of sodium chloride. The sodium chloride was removed by suction filtration and the basic hydroxylamine filtrate then transferred to a round bottom flask immersed in an ice bath and equipped with a sealed stirrer and condenser. A quantity of 225 g. of N-vinyl-5-methyl-2-oxazolidinone-maleic anhydride copolymer (prepared as described in U.S. Patent 3,044,992) was slowly added to the basic hydroxylamine solution with stirring. The resulting thickened mixture was diluted by the addition of 250 ml. of methanol, to facilitate reaction, followed by continuous stirring of the reaction mixture for two hours. The methanol-insoluble copolymer salt product was separated by centrifugation, washed with methanol and dried. The polymeric product was identified by infrared analysis as having moieties whose structure corresponds to

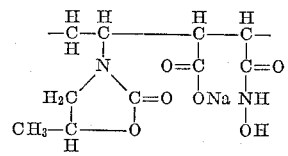

This copolymer salt product was highly soluble in water and formed an aqueous solution having a pH of 7.

Other copolymers formed by the individual reactions of maleic anhydride with the heterocyclic compounds N-vinyl-2-oxazolidinone and N-vinyl-5-ethyl-2-oxazolidinone show similar results when substituted for N-vinyl-5-methyl-2-oxazolidinone in the above procedure with formation of the corresponding N-hydroxymaleamic acid copolymer salt. Similarly, potassium hydroxide is substituted for sodium hydroxide to obtain the potassium salt form of the desired product.

The utility of the novel copolymer salts of the present invention to sequester some metal ions and to enable selective precipitation of others over a wide pH range is demonstrated in the following examples.

Example 2

The sodium salt of N-vinyl-5-methyl-2-oxazolidinone-N-hydroxymaleamic acid copolymer prepared in Example 1, above, was employed to prepare an aqueous solution in which the final copolymer salt concentration was $2 \times 10^{-2}$ moles per liter. One 80 ml. sample of this solution, prepared with deionized water, was adjusted to a pH of 10 by the drop-wise addition of NaOH and a second sample similarly was prepared with a pH of 11. A known amount of iron was added volumetrically from a standardized ferric sulfate solution and the sample was adjusted to the desired pH at a final volume of 100 ml.

The samples were allowed to stand for a period of 14–20 days and the precipitated ferric hydroxide was then removed by filtration, washed with hot 1 percent ammonium nitrate and dissolved in 2 N sulfuric acid. After passing the resultant ferric sulfate through a column of granular, amalgamated zinc (Jones reductor) the solution was titrated with standardized potassium dichromate using sodium diphenyl amine sulfonate as an oxidation-reduction indicator. The amount of iron, in milligrams, retained in solution by the copolymer salt was calculated and divided by the weight of coplymer salt, in grams, employed. At pH 10, the copolymer salt was found to sequester 350–450 mg. of iron per gram of copolymer salt; at pH 11 the result was 300–400 mg. of iron sequestered per gram of copolymer salt.

Example 3

Table 1, below, presents data from experiments made on the effect of copolymer salts of the present invention, i.e. N-vinyl - 5 - methyl oxazolidinone-sodium-N-hydroxymaleamate (hereinafter VOM-NHMA Na+), N-vinyl oxazolidinone-sodium-N-hydroxymaleamate (hereinafter VO-NHMA Na+) and N-vinyl-5-ethyl oxazolidinone-sodium-N-hydroxymaleamate (hereinafter VOE-NHMA Na+), on the solubility of $Cu^{++}$, $Co^{++}$ and $Ni^{++}$ at various pH values.

The 0.5 M solutions of the metal ion salts employed have a pH=4.0 and will form a precipitate at pH>6.0. When the designated copolymer salts are added to the copper salt solutions a precipitate initially forms which dissolves, with mixing, in a short time. A 1:1 mole ratio of the copolymer salt:metal ion was used in these experiments.

TABLE I

| Metal Salt | VO-NHMA Na+ (10% solution, pH=6) | VOM-NHMA Na+ (10% solution, pH=7) | VOE-NHMA Na+ (10% solution, pH=7) |
|---|---|---|---|
| 0.5 M CuSO₄ | precipitate forms pH 2 to pH<4. Soluble pH<2 and pH 4–11. | Precipitate forms pH 2 to pH<3. Soluble pH<2 and pH 3–11. | Precipitate forms pH 2 to pH<3. Hazy at pH<2. Soluble pH 3–11. |
| 0.5 M CoSO₄·7 H₂O | Soluble over entire pH range | Soluble over entire pH range | Soluble pH 3–11. Hazy at pH <3. |
| 0.5 M NiSO₄·6 H₂O | do | do | Soluble pH 3–11. Hazy at pH<3. |

I claim:
1. A water-soluble resinous polymer of the formula:

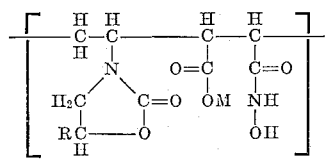

wherein R is selected from the group consisting of hydrogen, methyl and ethyl, and M is selected from the group consisting of sodium and potassium; said polymer being characterized by Fikentscher K values greater than 10.

2. A method for preparing the polymer of claim 1 which comprises the steps of:

(1) mixing together
  (a) a water-soluble copolymer of maleic anhydride and an N-vinyl-cyclic carbamate selected from the group consisting of N-vinyl-2-oxazolidinone, N-vinyl-5-methyl-2-oxazolidinone and N-vinyl-5-ethyl-2-oxazolidinone wherein the moieties derived from the maleic anhydride and the cyclic carbamate are incorporated in substantially equimolar proportions, said copolymer being characterized by Fikentscher K value of at least about 10, and hydroxylamine, said copolymer and hydroxylamine being employed in substantially equimolar proportions, (2) in an inert solvent containing an excess of an alkali metal base selected from sodium hydroxide or potassium hydroxide, (3) at a temperature of from about −10° C. to the boiling point of said solvent, and (4) separating the N-vinyl-cyclic carbamate-N-hydroxy maleamic acid copolymer salt product formed which is insoluble in said inert solvent.

References Cited
UNITED STATES PATENTS

| | | | |
|---|---|---|---|
| 3,030,339 | 4/1962 | Tousignant et al. | 260—77.5 |
| 3,044,992 | 7/1962 | Hibbard et al. | 260—77.5 |
| 3,216,974 | 11/1965 | Gyzen et al. | 260—77.5 |

DONALD E. CZAJA, *Primary Examiner.*

LEON J. BERCOVITZ, G. W. RAUCHFUSS, J. J. KLOCKO, *Assistant Examiners.*